the 
United States Patent [19]
Hazelhurst et al.

[11] 3,739,330
[45] June 12, 1973

[54] GEOPHONE ASSEMBLY

[75] Inventors: Gerald D. Hazelhurst; Don L. Fussell; Hayward T. Guyton, all of Houston, Tex.

[73] Assignee: Mark Products, Inc., Houston, Tex.

[22] Filed: July 8, 1970

[21] Appl. No.: 53,195

[52] U.S. Cl.......................... 340/17, 174/64, 336/30
[51] Int. Cl............................................... G01v 1/16
[58] Field of Search................. 340/17; 174/65, 64; 336/30

[56] References Cited
UNITED STATES PATENTS

| | | | |
|---|---|---|---|
| 3,445,809 | 5/1969 | McLoad | 340/17 |
| 3,406,781 | 10/1968 | Willner | 340/17 |
| 2,487,029 | 11/1949 | Piety | 174/65 |
| 2,282,239 | 5/1942 | Opsahl | 174/65 |
| 2,477,172 | 7/1949 | Brownlow | 174/65 |

FOREIGN PATENTS OR APPLICATIONS

| | | | |
|---|---|---|---|
| 27,491 | 3/1964 | Germany | 174/65 |

*Primary Examiner*—Benjamin A. Borchelt
*Assistant Examiner*—N. Moskowitz
*Attorney*—Hyer, Eickenroht, Thompson & Turner

[57] ABSTRACT

A geophone is enclosed by a case of nonconductive material to provide a geophone assembly for connecting into an external electrical circuit. An opening is provided in the case in which an electrical contact or probe can be located to make electrical contact with the internal circuit of the geophone by engaging a component of the circuit, such as a terminal external of the geophone housing or the housing itself, which may become part of the internal circuit when the geophone is lying on its side. This allows the internal circuit of an individual geophone to be tested without removing the case from the geophone. Means are provided for closing the opening.

9 Claims, 9 Drawing Figures

Patented June 12, 1973

Gerald D. Hazelhurst
Don L. Fussell
Hayward T. Guyton
INVENTORS

BY
Hyer, Eickenroht
Thompson & Turner

ATTORNEYS

Patented June 12, 1973

Gerald D. Hazelhurst
Don L. Fussell
Hayward T. Guyton
INVENTORS

BY *Hyer, Eckenrodt,*
*Thompson & Turner*

ATTORNEYS

GEOPHONE ASSEMBLY

This invention relates to geophones generally and in particular to geophone assemblies in which the geophone is enclosed in a nonconductive case for use in the field.

Most of the geophones in use today in seismic oil exploration work on land are of the electromagnetic type. This type of geophone uses the relative movement between a permanent magnet and a coil to provide a signal proportional to earth movement. The coil and magnet are usually located in a metal, electrically conductive housing. Terminals connected to each end of the coil extend out of the housing to permit the geophone to be connected to other geophones. Usually, there are several geophones connected together either in series or in series-parallel when used in the field.

To protect the geophone and to insulate the geophone from the ground on which it will be placed, it is the general practice to assemble the geophone with a case of nonconductive material that encloses the geophone and portions of the external cable connected to it. Today the material most commonly used for the case is a plastic that can be molded into the desired shape to encase the geophone and that is also strong enough to provide good protection for the geophone.

The wire used to form the coils in geophones and to provide the connection between the terminals and the ends of the coils is of necessity relatively small in diameter. For this reason the wire is susceptible to breaking due to impact, particularly in the geophone that employs a moving coil, which is by far the most common type of geophone in use today. When one of these small wires breaks in a system employing several geophones connected in series, the geophone with the "open" must be located. This is done by connecting a voltmeter or the like across the coil of each geophone until the open coil is located. With the previously used geophone assemblies, the plastic case must be removed from each geophone tested. This is time-consuming work, and also it is preferable not to remove a case from a geophone in the field unless it is absolutely necessary. Yet, heretofore, to find an "open" in a group of geophones connected in series, unless the person doing the repairing is extremely fortunate, he will have to remove the case from some geophones that are perfectly all right before he locates the one with the "open."

It is an object of this invention to provide a geophone assembly in which the internal circuit of the geophone can be tested without removing the outer plastic case from the geophone.

It is yet another object of this invention to provide a geophone assembly that will allow electrical contact to be established between the terminal or housing of a geophone through the outer nonconductive case without removing the case from the geophone and without destroying the protective ability of the case.

It is another object of this invention to provide a geophone assembly that will permit electrical contact to be established between a terminal or the housing of the geophone through the outer case of the assembly without creating an opening in the outer case that will reduce the effectiveness of the outer case to protect the geophone from the elements, thereby allowing the internal circuits of a group of geophone assemblies connected together through an electric cable to be individually tested quickly without having to disassemble each geophone tested from its case.

These and other objects, advantages, and features of this invention will be apparent to those skilled in the art from a consideration of this specification, including the attached drawings and appended claims.

Figure 1:
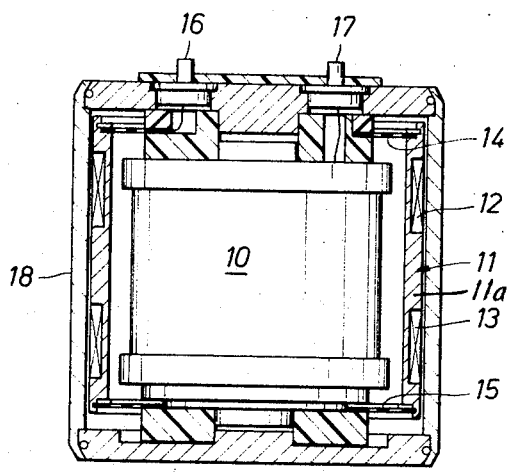
FIG. 1 is a vertical cross sectional view of a typical geophone commmonly in use in the field today.

The geophone of FIG. 1 is typical of the electromagnetic type commonly used in seismic work today. It includes permanent magnet assembly 10, which is located along the longitudinal axis of annular coil-mass assembly 11. The coil-mass assembly includes two axially spaced annular coils 12 and 13 that are wound on annular member 11a. This assembly is supported by spring spiders 14 and 15 for axial movement relative to permanent magnet assembly 10. The adjacent end of coils 12 and 13 are connected together. The other ends of the coils are connected to terminals 16 and 17, which extend outside of housing 18 of the geophone. Thus, coils 12 and 13 and the terminals form the internal circuit of the geophone.

Housing 18 is usually made of a metallic material that is electrically conductive. Generally, there are two types of geophones in used today. In one type, the housing is electrically insulated from the internal electric circuit of the geophone at all times. In the second type, the components of the internal circuit are spaced from and are therefore out of electrical contact with the housing when the geophone is in a generally upright position because the weight of the coil-mass assembly is designed to flatten the spring spiders, as shown in FIG. 1. By laying the geophone on its side, however, the spring spiders will move the coil-mass assembly horizontally until its upper end engages the top of the housing. This establishes electrical contact between the coil-mass and the housing at the point.

Figure 3:
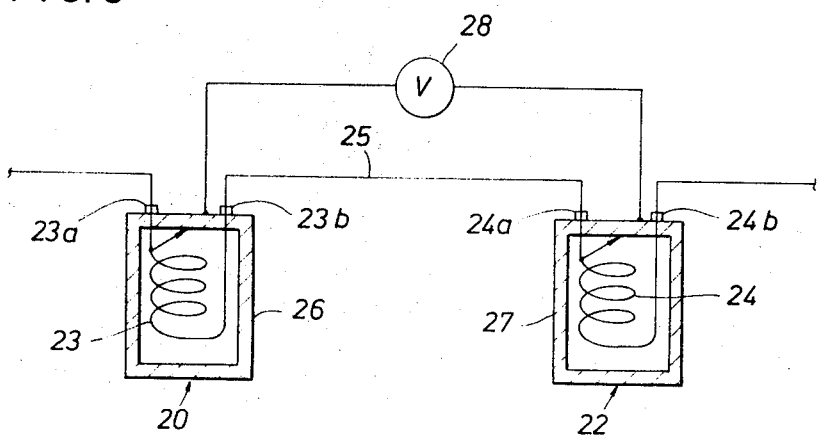
FIG. 3 is an electrical diagram illustrating the manner in which geophones can be checked for "opens"

FIG. 3 shows schematically how geophone 20 of the second type can be checked to see if its internal circuit is damaged. As shown, coil 23 of geophone 20 is connected in series with coil 24 of geophone 22. By laying the two geophones on their sides, the upper end of coil 23 is grounded to housing 26 and the upper end of coil 24 is grounded to housing 27. Voltmeter 28, connected between the housings, will now indicate if coil 23 is broken.

To check geophones of the first type, the probes of voltmeter 28 are placed in contact with terminals 23a and 23b; or, if it is preferred to also check cable section 25, terminals 23a and 24a.

Figure 2:
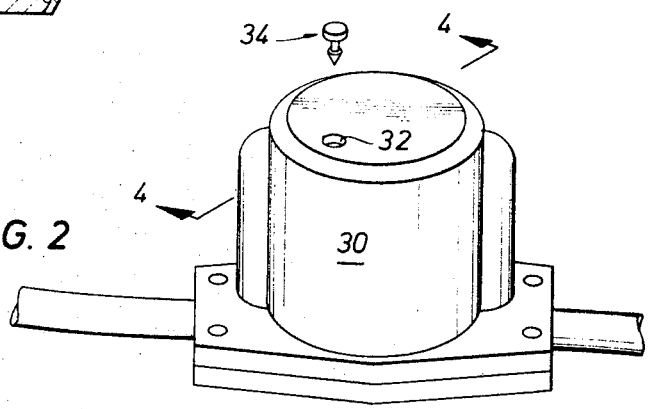
FIG. 2 is an isometric view of the geophone of FIG. 1, assembled with an outer case, constructed in accordance with the preferred embodiment of this invention and connected to a cable.
Figure 4:
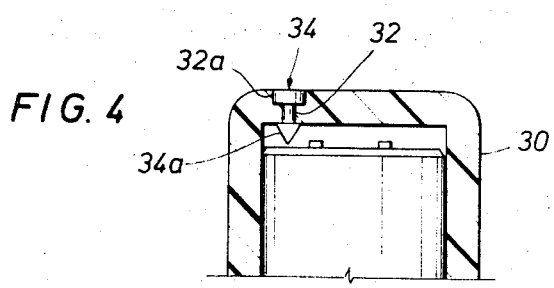
FIG. 4 is a cross sectional view through the upper portion of the outer case of the geophone assembly of FIG. 2 taken along line 4—4 and showing the geophone in elevation.

In accordance with this invention, the internal circuit of a geophone can be checked without disassembling the outer, nonconductive case from the geophone. To accomplish this, in accordance with the embodiment shown in FIGS. 2, 4, and 9, outer case 30 is provided with opening 32. Section 32a (FIG. 4) of the opening is of increased diameter. The opening is closed by plug 34 of elastomeric material, such as rubber. This plug has lower portion 34a that is larger in diameter than opening 32 so that when the plug is pushed through opening 32, lower portion 34a will expand and engage the inside of case 30 and resiliently hold the plug in the opening. The upper end of plug 34 fits the enlarged section 32a of the opening to limit the distance the plug can enter the case.

Figure 9:
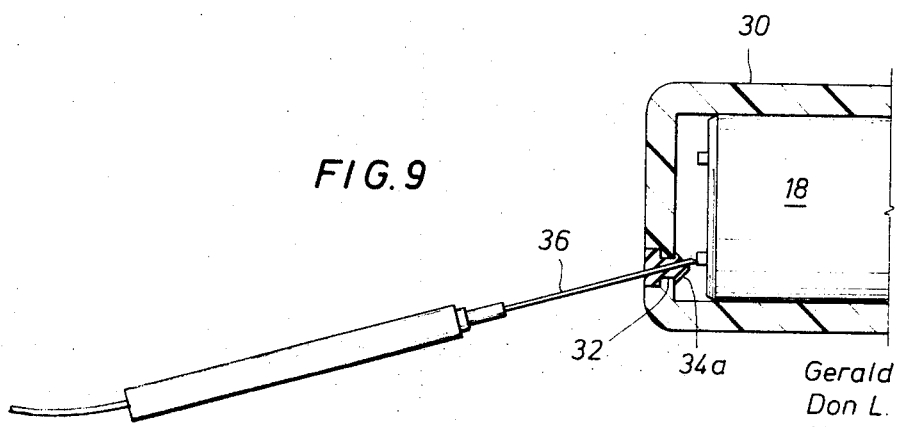
FIG. 9 is a view similar to FIG. 4 showing the probe of an ohmmeter or the like in electrical contact with the housing of the geophone inside the case.

Once in position, a thin needle-like rod, such as probe 36, can be pushed through the elastomeric material of the plug to engage housing 18 of the geophone, as shown in FIG. 9, and establish electrical contact with it. After the geophone has been tested, probe 36 can be removed and the elastomeric material of the plug will close the opening formed therein by the probe due to its own resiliency and memory.

The following alternate embodiments will be described as they would be used with geophones of the type where the housing is connected to the coil and becomes part of the internal circuit of the geophone when the geophone is placed in a given position, such as on its side. It is to be understood that for the other type geophone, connections will be made with an appropriate one of the terminals.

Figure 5:
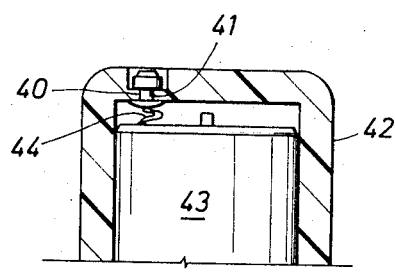
FIG. 5 is a view similar to FIG. 4 of an alternate embodiment of this invention.

In FIG. 5 an alternate embodiment of the invention is provided. In the embodiment shown in FIG. 5, member 40 of conductive material is positioned in opening 41 in the upper end of case 42. Member 40 is electrically connected to housing 43 of the geophone by flexible lead wire 44 to provide a nonrigid connection between the member and the housing. This is preferred, since some relative movement between the two may occur. With this arrangement as shown in FIG. 5, the internal circuit of geophone 43 can be checked by voltmeter 28, without removing the case, by placing one probe in contact with member 40 and the other probe in contact with a similar member on an adjacent geophone. Conductive member 40 preferably is placed in the top of the case, since it should be located as far away from the ground as possible. Also, this position will allow the geophone to be at least partially buried without connecting it to ground.

Figure 6:
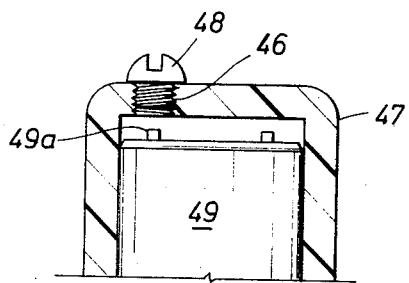
FIG. 6 is a view similar to FIG. 4 of yet another alternate embodiment of the invention.

In FIG. 6, opening 46 in case 47 is provided with threads to receive cap screw 48. Cap screw 48 can be removed and a probe, such as probe 36 of voltmeter 28, can be inserted through opening 46 into contact with either terminal 49a or the housing of geophone 49, as desired, depending upon which type of geophone this particular embodiment is being employed with.

Figure 7:
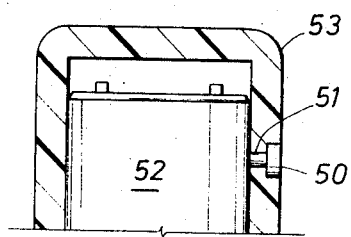
FIG. 7 is a view similar to FIG. 4 of another alternate embodiment of this invention.

In FIG. 7, conductive member 50 is located in opening 51 in constant contact with housing 52 of the geophone positioned in case 53. This allows electrical contact to be made with housing 52 simply by contacting electrically conductive member 50.

Figure 8:
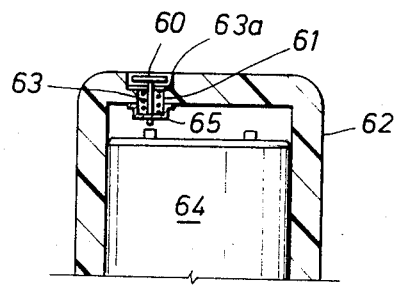
FIG. 8 is a view similar to FIG. 4 of another alternate embodiment of the geophone assembly of this invention.

In FIG. 8, electrically conductive member 60 is located in opening 61 in case 62. Spring 63 has its upper end anchored to plate 63a and its lower end to cup-shaped member 65. The spring urges cup-shaped member 65 and member 60, which is attached to member 65, upwardly out of opening 61 away from housing 64 of the geophone. Cup-shaped member 65 acts as stop means to limit the distance spring 63 can move member 60 upward. Member 65 also closes the opening when it is so limiting the upward movement of the member. By pushing down on member 60, the lower end thereof can be moved into contact with housing 64 of the geophone located in case 62. This will permit the internal circuitry of the geophone to be checked in the manner described above.

As explained above, the openings and various contact arrangements described above can be positioned so that electrical contact is made with the terminals, such as terminal 16 and 17 of the geophone of FIG. 1. This would be desirable in situations where the case is maintained insulated from these components.

From the foregoing description of embodiments of this invention by way of example, it will be seen that this invention is one well adapted to attain all of the ends and objects hereinabove set forth, together with other advantages which are obvious and which are inherent to the apparatus and structure.

The invention having been described, what is claimed is:

1. A geophone assembly comprising a geophone including electrical circuit means and a housing for the electrical circuit means, said circuit means including terminal means exposed externally of the housing for connecting the electrical circuit means of the geophone into an external electrical circuit, a case of nonconductive material for enclosing the geophone, said case having an opening in which an electrical contact can be positioned to make electrical contact with the electrical circuit means of the geophone, and means sealing said opening, comprising a member of electrically conductive material extending through the opening, and positioned for movement into electrical contact with the electrical circuit of the geophone, spring means urging the member out of the opening, stop means limiting the distance the spring means can urge the member out of the opening, and seal means for closing the opening when the stop means are limiting the travel of the member out of the opening.

2. A geophone assembly comprising a geophone including electrical circuit means and a housing for the electrical circuit means that is made of electrically conductive material and is in the electric circuit means of the geophone when the geophone is placed in a given position, said circuit means including terminal means exposed externally of the housing for connecting the electrical circuit means of the geophone into an external electrical circuit, a case of non-conductive material for enclosing the geophone, said case having an opening in which an electrical contact can be positioned to make electrical contact with the electrical circuit means of the geophone, and means sealing said opening.

3. The geophone of claim 2 in which the means sealing the opening comprises a body of electrically conductive material that is in electrical contact with the housing.

4. A geophone assembly comprising a geophone including electrical circuit means and a housing for the electric circuit means of electrically conductive material that is in the electric circuit of the geophone when the geophone is placed in a given position, terminal means exposed externally of the housing for connecting the electrical circuit means of the geophone into an external electrical circuit, a case of nonconductive material for enclosing the geophone, said case having an opening in which an electrical contact can be positioned to make electrical contact with the electrical circuit means of the geophone, and means sealing said opening.

5. The geophone assembly of claim 4 in which said means sealing the opening in the case comprises a plug of elastomeric material through which a needle-like probe can be inserted to contact the housing and withdrawn without destroying the ability of the plug to seal the opening.

6. The geophone of claim 5 in which the opening is positioned for the needle-like probe to contact a terminal of the geophone.

7. The geophone of claim 4 in which said means sealing the opening comprises a body of electrically conductive material that is in electrical contact with the geophone housing.

8. The geophone assembly of claim 4 in which the means sealing the opening comprises a member that can be removed to allow the insertion of an electrical contact through the opening into electrical contact with the housing or terminal of the geophone.

9. The geophone assembly of claim 4 in which the means sealing the opening comprises a member of electrically conductive material extending through the opening, and positioned for movement into electrical contact with the housing, spring means urging the member out of the opening, stop means limiting the distance the spring means can urge the member out of the opening, and seal means for closing the opening when the stop means are limiting the travel of the member out of the opening.

* * * * *